United States Patent
Runyan et al.

(10) Patent No.: US 6,263,833 B1
(45) Date of Patent: Jul. 24, 2001

(54) LIVESTOCK FEED DISPENSER

(76) Inventors: Clyde Runyan; Casey Runyan; Chance Runyan, all of P.O.Box 144, Mill Creek, OK (US) 74856

( * ) Notice: Subject to any disclaimer, the term of this patent is extended or adjusted under 35 U.S.C. 154(b) by 0 days.

(21) Appl. No.: 09/501,306

(22) Filed: Feb. 10, 2000

(51) Int. Cl.[7] .................................................. A01K 5/01
(52) U.S. Cl. ..................... 119/51.11; 119/57.2; 119/57.4; 119/57.5; 119/57.7
(58) Field of Search ................................ 119/51.11, 57.1, 119/57.2, 57.3, 57.4, 57.5, 57.6, 57.7, 57.92; 222/650

(56) References Cited

U.S. PATENT DOCUMENTS

| | | |
|---|---|---|
| 3,065,808 | 11/1962 | Dodgen . |
| 4,665,862 | 5/1987 | Pitchford, Jr. . |
| 4,722,300 | 2/1988 | Walker et al. . |
| 4,852,521 * | 8/1989 | Harrington ........................ 119/51.04 |
| 4,907,538 | 3/1990 | Helmle et al. . |
| 5,008,821 | 4/1991 | Pratt et al. . |
| 5,230,300 | 7/1993 | Mezhinsky . |
| 5,275,129 | 1/1994 | Vigesaa et al. . |
| 5,299,529 | 4/1994 | Ramirez . |
| 5,303,672 | 4/1994 | Morris . |
| 5,363,805 * | 11/1994 | Wing ................................... 119/51.11 |
| 5,424,957 | 6/1995 | Kerkhoff et al. . |
| 5,636,118 | 6/1997 | Brewster et al. . |
| 5,732,652 | 3/1998 | Allen . |
| 5,878,402 | 3/1999 | Brewster et al. . |
| 5,899,169 | 5/1999 | Jenson . |
| 5,921,200 | 7/1999 | Bondarenko et al. . |
| 5,970,912 | 10/1999 | Supple et al. . |
| 6,182,606 * | 2/2001 | Wells et al. ........................ 119/51.11 |

FOREIGN PATENT DOCUMENTS

| | | |
|---|---|---|
| 555937 | 8/1993 | (EP) . |
| 598494 | 5/1994 | (EP) . |
| 2437778 | 6/1980 | (FR) . |

* cited by examiner

*Primary Examiner*—Charles T. Jordan
*Assistant Examiner*—Yvonne R. Abbott
(74) *Attorney, Agent, or Firm*—Richard C. Litman

(57) ABSTRACT

A portable livestock feed dispenser is mounted on the bed of a flatbed truck, pickup, or other suitable vehicle. The dispenser comprises an elongate box or hopper with a dispenser end positioned adjacent one edge or end of the flatbed, for dispensing livestock feed to a feed site as desired. A lid extends over the entire top of the apparatus, with a hinge system allowing the lid to be positioned to one side of the device for filling the hopper. A lateral power auger extends the length of the structure, and receives feed from the upper hopper for dispensing from the dispenser outlet. The auger receives power from the electrical or other power supply of the vehicle upon which the dispenser is mounted, with auger operation being controllable remotely from the vehicle cab. A counter is driven by rotation of the auger, for measuring the amount of feed dispensed by the device. The counter may be mechanical, but is preferably electrically operated in order to provide a remote readout in the cab of the vehicle. A passage is provided through the box, for handling the device using a square section hay bale spear or the like for installation or removal from the vehicle. The passage also provides a rearward sight window for the vehicle operator when the dispenser is positioned adjacent the rear wall of the vehicle cab. The present dispenser eliminates most of the manual labor which has been a part of livestock feed supply operations in the past.

18 Claims, 7 Drawing Sheets

LIVESTOCK FEED DISPENSER

BACKGROUND OF THE INVENTION

1. Field of the Invention

The present invention relates generally to animal husbandry and livestock care and feeding, and more specifically to a portable device for dispensing livestock feed in measured quantities to feeding sites in the field. The present device is mounted on the bed of a flatbed truck or in the bed of a pickup truck or the like, with the dispensing of the feed being controlled remotely from the cab of the vehicle.

2. Description of the Related Art

Caring for livestock and farm animals is a nearly continuous task for the farmer or rancher, with the job being made even more difficult with animals in the field, as opposed to those who return to a barn or shed at feeding times (e.g., dairy cows). For range animals dependent upon a prepared supply of food, the rancher must provide a regular supply of feed for the animals (cattle, sheep, etc.) at regular locations, with those locations most likely being relatively widespread.

Conventionally, this has been accomplished by loading a truck, farm wagon, or other appropriate vehicle with a supply of feed, and driving to the site (or sites) where the feed is to be placed for consumption by the livestock. The vehicle must be stopped at the site, with the rancher or caretaker leaving the cab and manually dispensing some of the feed from the back of the vehicle or wagon. Aside from the laborious work involved, such a distribution method does not provide any means of accurately measuring the amount of feed left in any one area. The rancher may know fairly precisely how much feed is placed on or in the vehicle at the beginning of the trip, but has no means of determining precisely how much feed is distributed at each location.

Accordingly, a need will be seen for a portable livestock feed dispenser which is removably installable on the flatbed of a truck, pickup truck bed, or other suitable vehicle. The feed dispenser comprises an elongate box structure with an internal power auger which dispenses feed from one end of the apparatus. By placing the dispenser with its outlet adjacent to one edge or end of the truck bed, the feed may be dispensed therefrom without need for labor from the vehicle operator. A top lid extending the width of the structure provides for filling the dispenser. The device also includes a counter for determining the amount of feed dispensed at any one site, and/or the total amount of feed dispensed.

A discussion of the related art of which the present inventor is aware, and its differences and distinctions from the present invention, is provided below.

U.S. Pat. No. 3,065,808 issued on Nov. 27, 1962 to John N. Dodgen, titled "Portable Feed Measuring And Mixing Apparatus," describes a vertically disposed, trailer mounted hopper having an open top with a vertically disposed dispensing auger in the center of the hopper. Weighing means is provided for the hopper when the feed is placed therein, but the Dodgen device has no means for measuring the amount of feed dispensed at each actuation of the auger, as provided by the present invention.

U.S. Pat. No. 4,665,862 issued on May 19, 1987 to Robert L. Pitchford, Jr., titled "Timed Automatic Pet Feed And Water Dispenser," describes a relatively small device incorporating automatic water dispensing as well as food dispensing. The Pitchford, Jr. device is connected to a water supply which dispenses water simultaneously with the pet food to make a thick, gravy-like mixture, rather than dispensing dry feed for livestock, as accomplished by the present invention. Moreover, Pitchford, Jr. includes a water dispenser and float mechanism for automatically filling a water supply for the pet as well. Thus, the Pitchford, Jr. apparatus is not portable, as is the present invention, but must be connected to a water supply at all times. In addition, the Pitchford, Jr. apparatus is operated by a timer and dispenses a predetermined amount of food with each operation. In contrast, the present invention is not automated, but may be remotely operated from the cab of the vehicle upon which it is mounted, with the operator determining the amount of feed dispensed according to a counter display.

U.S. Pat. No. 4,722,300 issued on Feb. 2, 1988 to Douglas G. Walker et al., titled "Automatic Feeder For Pets And Other Animals," describes a device using a vibrating pan to shake food down into a feeding trough beneath the device, rather than an auger for dispensing the feed from one end of the device into a separate trough or other area, as provided by the present invention. The Walker et al. feeder is more closely related to the Pitchford, Jr. device discussed immediately above than to the present invention, due to its automated dispensing of a predetermined amount of food, with that amount not being controllable by an operator at the time of dispensing, as in the present remotely controlled and portable dispenser.

U.S. Pat. No. 4,907,538 issued on Mar. 13, 1990 to Fred J. Helmle et al., titled "Multiple Bin Cow Feeder," describes a self propelled device having two open dispensing hoppers, for dispensing different feed mixes or ingredients to different feed troughs or feeding stations for individual animals. The device is electronically controlled from an operating station thereon, with a separate laterally disposed horizontal auger for each hopper. Counting means is provided for each auger, to measure the number of revolutions of each auger in order to determine the amount of feed dispensed. The Helmle et al. device differs considerably from the present invention, in that (a) no cover for the hopper(s) is provided; (b) the device cannot be removed from its propulsion mechanism, for removable installation on a farm vehicle; and (c) accordingly, no remote control or display means is provided.

U.S. Pat. No. 5,008,821 issued on Apr. 16, 1991 to William C. Pratt et al., titled "Computerized Process And System For Assigning And Delivering Feed To Animals In A Feedlot," describes a semi-automated system for determining the proper quantities and mixtures of feed to be distributed to different feed bunks or troughs in a series of feed lot pens. A hopper disposed within the bed of a pickup truck is disclosed, but no cover or lid, lateral auger dispensing, nor removability for the hopper are disclosed. Moreover, Pratt et al. use an integral scale to weigh the feed in the hopper, rather than quantitatively measuring the auger output.

U.S. Pat. No. 5,230,300 issued on Jul. 27, 1993 to Victor Mezhinsky, titled "Automatic Dry Food Feeder For Animals," describes another automated pet feeding device akin to the devices of the Pitchford, Jr. and Walker et al. U.S. Patents discussed above. The Mezhinsky apparatus uses a rotary vane dispenser at the bottom of the food hopper, rather than an auger (Pitchford, Jr.) or vibrating shaker tray (Walker et al.). As in the Pitchford, Jr. and Walker et al. devices, the Mezhinsky apparatus can only dispense a predetermined amount of food at each operation, and the amount cannot be adjusted at the time of dispensing due to the automatic nature of the operation of the device. In contrast, the present feeder is operated remotely but in real time by the operator of the device and vehicle upon which it is carried, with the operator being able to adjust the amount of feed being dispensed with each operation as desired, according to a readout located in the cab of the vehicle or elsewhere as desired.

U.S. Pat. No. 5,275,129 issued on Jan. 4, 1994 to T. Loren Vigesaa et al., titled "Portable Automatic Animal Feeding System," describes another completely automated device for feeding livestock and other range animals. The device is portable, in that it may be loaded aboard the back of a pickup truck or flat bed for transport to a location in the field, where it is placed for stationary operation. However, it is not adapted for operation while being carried on the back of a flatbed or pickup truck, as provided by the configuration of the present invention. The Vigesaa et al. device includes a feed bunk or trough below the auger output means, with the auger dispensing food to the underlying bunk or trough. Such an arrangement would require the animals to climb aboard the vehicle to feed, which is obviously impractical. In contrast, the present feed dispenser is carried upon a vehicle and dispenses the feed from one end of its structure, into a separate fixed location trough to which the vehicle and feed dispenser are driven. As the Vigesaa et al. device is intended to be remotely located, it is automated and delivers a predetermined quantity of feed at each operation. In contrast, the present dispenser delivers feed only upon command by the operator, who may select the quantity of feed dispensed according to a readout provided by the device.

U.S. Pat. No. 5,299,529 issued on Apr. 5, 1994 to Peter Ramirez, titled "Automatic Feeder For Dogs And Other Animals," describes a relatively complex device for automated care of pets. As in other feeding devices discussed above, the Ramirez device is automated and is preset to dispense a predetermined quantity of food at predetermined times, without input from a human operator. Ramirez provides for remote operation and input to the device using a telephone interface, but this is obviously unsuitable for a device which is mounted on a vehicle with the operator only a few feet away in the cab of the vehicle. Moreover, the Ramirez feeder includes a feed trough or tray, whereas the present invention does not. As noted further above, the mounting of the present dispenser to a vehicle allows feed to be dispensed over the side or end of the vehicle to a separate trough, tray, or area, which is the only practicable means of dispensing food to range animals or the like.

U.S. Pat. No. 5,303,672 issued on Apr. 19, 1994 to Stephen Morris, titled "Food Dispensing Apparatus For Small Animals," describes a device having a rotary drum disposed beneath a hopper. The drum is divided into a series of selectively closable compartments, and rotates once per day. Each open compartment is filled with food as it rotates beneath the hopper, and then dumps the food as it rotates downwardly. The device is completely automatic and cannot be controlled by an operator to deliver more or less food, as can the present device with its remotely controlled auger. The Morris device is small, and is directed to providing fish feed to an aquarium rather than for feeding livestock.

U.S. Pat. No. 5,424,957 issued on Jun. 13, 1995 to Gary N. Kerkhoff et al., titled "Accurate Metering And Control System And Method For Livestock Feeding Operation," describes an automated system utilizing a relatively large truck with an integral, permanently installed open top hopper and feed dispensing chute. Regardless of the specifics of the automated system, the Kerkhoff et al. dispensing mechanism cannot be removed from the vehicle, as can the present feed dispenser. Moreover, Kerkhoff et al. use a feed dispensing sensor measuring the weight of the feed being dispensed from the chute, rather than measuring the quantity by means of measuring the rotation of the auger, as in the present invention.

U.S. Pat. No. 5,636,118 issued on Jun. 3, 1997 to Sherman H. Brewster et al., titled "Method And Apparatus For Uniform Delivery Of Feed Ration Along A Feedbunk," describes a complex system including a stationary, permanent computer installation which communicates with the mobile feed delivery vehicles. Illustrated is a pickup truck having an open hopper in the bed, but no cover or lid for the hopper is disclosed, nor is any specific dispensing means from the hopper disclosed. As in the Pratt et al. '821 U.S. Patent cited further above, Brewster et al. utilize a weight scale disposed between the hopper and the truck bed to weigh the feed and thus determine the amount of feed dispensed. As noted further above, the present invention utilizes a completely different means of measuring the feed dispensed, by counting the revolutions of the dispensing auger to measure quantity.

U.S. Pat. No. 5,732,652 issued on Mar. 31, 1998 to Peter W. Allen, titled "Apparatus And Method For Dispensing Flowable Material," describes a wagon or trailer having a hopper permanently and integrally installed therewith. No auger dispenser means is provided; rather, a rotary paddle dispenser throws loose or flowable material outwardly some distance from the apparatus, rather than merely dispensing it from a door or opening at one end of the hopper, as in the present invention. A metering device is noted by Allen, but no specific description is provided, particularly in the form of any illustration thereof. Moreover, no means for the operator to remotely measure the amount of material being dispensed, or to remotely control the amount from the operator's position of the towing vehicle, is provided by Allen, whereas these features are a part of the present invention. It is noted that due to the nature of the Allen apparatus to fling or throw the feed, that it is not suitable for delivering the feed to a feed trough or bunk, as provided by the present invention.

U.S. Pat. No. 5,878,402 issued on Mar. 2, 1999 to Sherman H. Brewster et al., titled "System And Method For Uniformly Delivering Feed Rations To The Feedbunks Of Animal Pens In A Feedlot," describes a system quite similar to that of the '118 U.S. Patent to the same inventors, discussed further above. The same differences and distinctions noted further above in the discussion of that patent, are seen to apply here as well.

U.S. Pat. No. 5,899,169 issued on May 4, 1999 to Bernard T. Jenson, titled "Automatic Hay, Grain And Pellet Feeder For Livestock," describes a device having a series of bins with openable floors for each. Feed is placed in the bins, and an automated control mechanism releases the floors to drop the feed into a lower feed trough or the like. As in the Vigesaa et al. feeder discussed further above, the Jenson feeder cannot be used while mounted on the back of a vehicle, as the animals would have to climb upon the vehicle in order to feed from the bottom trough. Moreover, the present invention is not automatically operated, as is the Jenson device, but rather uses remote actuation means controlled by the vehicle or other operator to dispense an amount of feed as desired, with the amount being controlled by the operator at the time of dispensing.

U.S. Pat. No. 5,921,200 issued on Jul. 13, 1999 to Paul J. Bondarenko et al., titled "Animal Feeder With Dispensing Mechanism And Dust Cover," describes a apparently manually operated hopper, with dispensing doors which are adjustably openable according to a linkage and series of selectable positions with which the actuating levers may be engaged. No remotely controllable actuating system is disclosed by Bondarenko et al., and moreover, the feed trough is positioned below the hopper, requiring animals to feed at the feeder. In contrast, the present device more should more accurately be termed a feed dispenser, rather than a feeder, as the present dispenser dispenses animal feed from a vehicle to a stationary feed trough or the like at a fixed location.

U.S. Pat. No. 5,970,912 issued on Oct. 26, 1999 to Kendra N. Supple et al., titled "Automatic Animal Feeder," describes a device in which the floor of the hopper drops away to release the entire amount of feed within the hopper, unlike the present invention with its operator selected dispensing amount at each operation. As in the other timer automated devices discussed above, the Supple et al. feeder teaches away from the objective of the present invention, by providing automatic operation when no operator need be present. As the present dispenser is a portable device removable installed on the back of a flatbed vehicle or the like, it must be positioned accurately in order to dispense the feed at the proper location. The present portable dispenser is actuated by the vehicle operator (or other operator in the cab of the vehicle), only as desired when reaching the desired location. The present dispenser may be remotely actuated from the vehicle cab, but is not automated by means of a timer.

French Patent Publication No. 2,437,778 published on Jun. 6, 1980 to Daniel Delahaye describes (according to the English abstract) a device more closely related to the device of the '529 U.S. Patent to Ramirez, discussed further above, than to the present invention. The device of the French Patent Publication includes an integral feeding dish and is automated by a timer mechanism, unlike the present invention. While the device of the French Patent Publication may be adjusted to regulate the amount of food dispensed at each operation, the amount cannot be adjusted by an operator who is operating the device when the food is dispensed.

European Patent Publication No. 555,937 published on Aug. 18, 1993 to N. V. Nederlandsche Apparatenfabriek NEDAP, titled "Feed Metering Device," describes a device having an auger which delivers feed into a box. The auger delivers the feed until a predetermined amount has been delivered to the box, whereupon an automated switching mechanism shuts off the auger and delivers the compacted feed to a trough or manger below the box. No means for an operator to adjust the amount of feed being dispensed at each operation, is disclosed. Moreover, the European Patent device includes a feed trough integral therewith, thus rendering the device impractical for mounting on a truck or the like for portability and for dispensing the feed to a series of different locations for animals to eat at those locations, rather than at the dispenser.

Finally, European Patent Publication No. 598,494 published on May 25, 1994 to Peter W. Allen, titled "Apparatus And Method For Dispensing Flowable Material," describes a device identical to that described in the '652 U.S. Patent to the same inventor and discussed further above. The same differences and distinctions noted in the discussion of the '652 U.S. Patent, are seen to apply here as well.

None of the above inventions and patents, taken either singly or in combination, is seen to describe the instant invention as claimed.

SUMMARY OF THE INVENTION

The present invention comprises a portable feed dispenser for use in feeding livestock and range animals. The present dispenser is installed (either removable or permanently, as desired) on the back of a flatbed truck or over the tailgate of a pickup truck, with its dispensing outlet positioned at the edge or end of the bed, as appropriate. A lateral auger is disposed within the lower portion of a hopper, and delivers feed from the hopper and out the dispensing outlet as desired. Control of the auger, and thus the amount of feed delivered, is provided by a control in the cab of the truck and/or at the dispenser. A counter is also provided to count the revolutions of the auger, and thus provide an indication of the amount of feed dispensed at each operation of the device. The device also includes a passage disposed through the hopper, for insertion of the spike of a bale spear for ease of installation and removal of the device to or from a vehicle. The port is oriented to provide a rear view therethrough when the dispenser is mounted adjacent to the rear window of the cab of the vehicle.

Accordingly, it is a principal object of the invention to provide an improved livestock feed dispenser for temporary or permanent installation upon the back of a vehicle having a cargo bed.

It is another object of the invention to provide an improved feed dispenser which is portable by means of its vehicle mounted installation, for transport to various feeding sites as desired.

It is a further object of the invention to provide an improved feed dispenser which includes remotely actuated operation from the cab of the vehicle upon which it is installed.

An additional object of the invention is to provide an improved feed dispenser including counter means for determining the quantity of feed dispensed during a given operation.

Still another object of the invention is to provide an improved feed dispenser which counter means may include a remotely disposed readout disposed with the remote control means for the auger mechanism.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
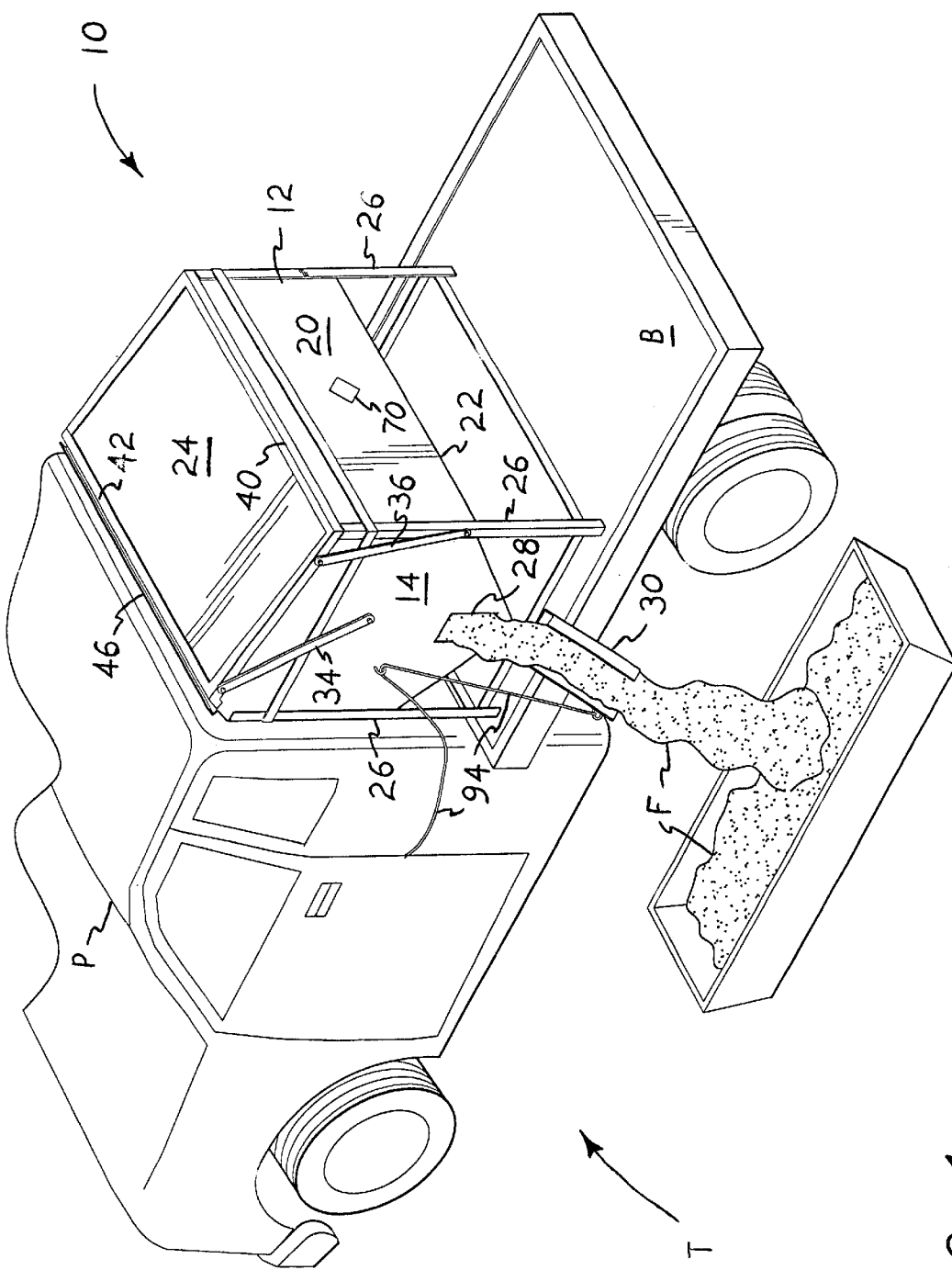
FIG. 1 is an environmental perspective view of the present livestock feed dispenser installed upon the back of a flatbed truck, showing the operation of the device.

The present invention comprises a portable livestock feeder, which may be removable installed upon the back of a truck or other suitable vehicle for transport to various sites for the delivery of livestock feed. FIG. 1 illustrates the present feed dispenser 10 installed upon the bed B of a light flatbed truck T. (It will be seen that the present feed dispenser 10 may be installed with any of a variety of different motor vehicle types, as indicated further below and in FIG. 6 of the drawings, but a vehicle such as the flatbed truck T is well suited for the carriage of the present dispenser 10.)

The livestock feed dispenser 10 essentially comprises an elongate closed hopper box 12 having a first or dispensing end 14 and an opposite second or auger drive end 16 (shown in FIGS. 2, 3, 4, and 7 of the drawings), first and second side walls, respectively 18 and 20 (the first side wall 18 being shown in FIGS. 2, 3, and 6 of the drawings), a generally V-shaped hopper bottom 22, and an openable lid or top 24. The hopper 12 is supported by a plurality of legs or supports 26 which may be bolted or otherwise conventionally secured to the bed B of the truck T as desired. The securing means should provide for the removability of the present livestock feed dispenser 10 from the truck T or vehicle, if desired.

Figure 2:
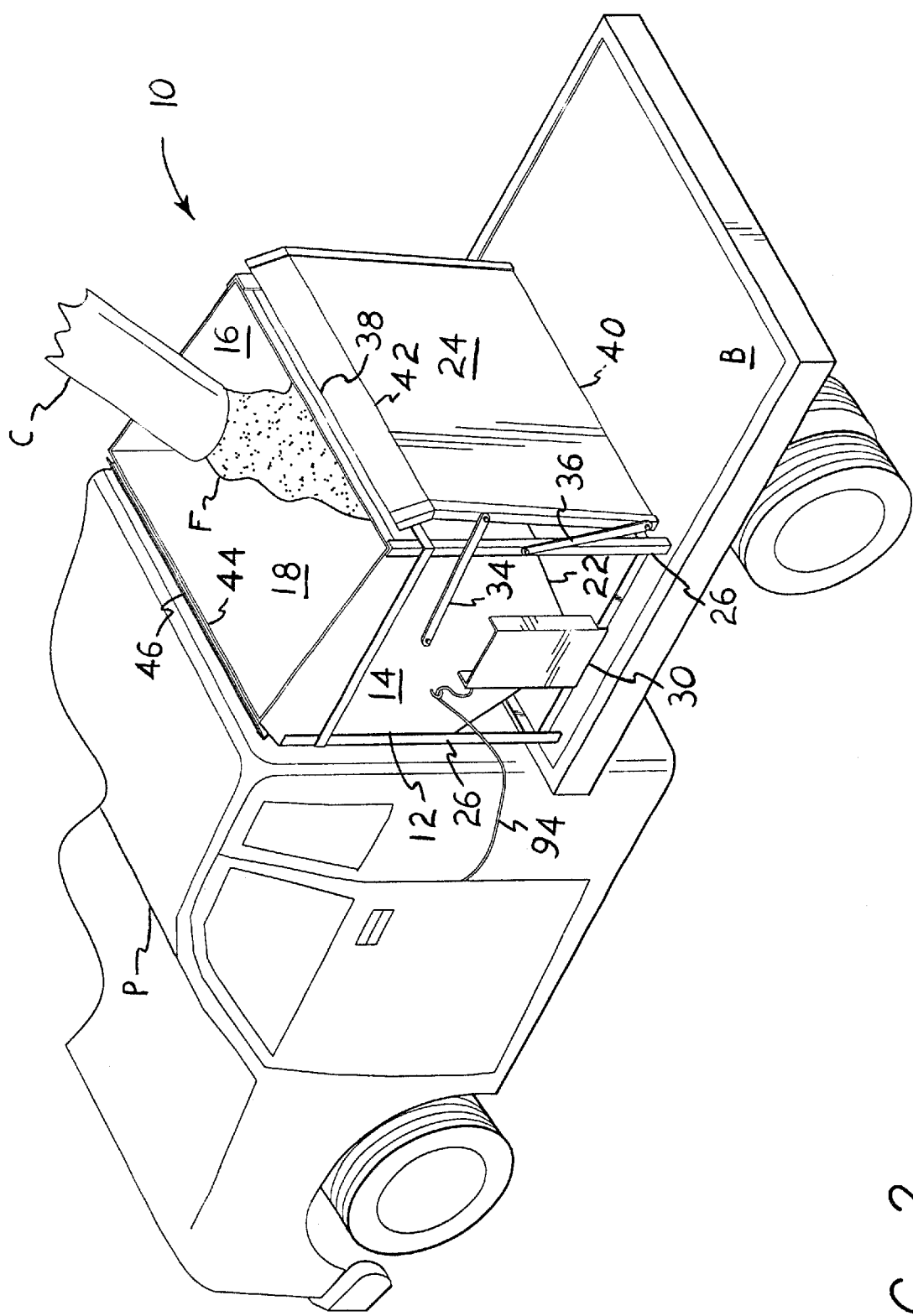
FIG. 2 is an environmental perspective view similar to the view of FIG. 1, but illustrating the loading of the device.

The first or dispensing end 14 of the hopper 12 is positioned over or adjacent one edge or end of the bed B (e.g., the left or driver's side or edge E, as shown in FIGS. 1 and 2) and includes a dispensing outlet 28 for the dispensing or delivery of livestock feed F therefrom. A closable, bottom hinged dispensing chute or door 30 receives the feed F from the outlet 28 and delivers it to a stationary feed bunker or trough separate from the dispensing truck T, generally as shown in FIG. 1 of the drawings. The bottom apex of the V-shaped hopper bottom 22 contains an auger 32 therein (shown in FIG. 3), which is axially aligned with the dispensing outlet 28. The auger 32 receives feed F (e.g., silage, hay, grain, etc.) from the interior of the hopper 12 and dispenses it from the open door 30, generally as illustrated in FIG. 1 of the drawings.

Figure 4:
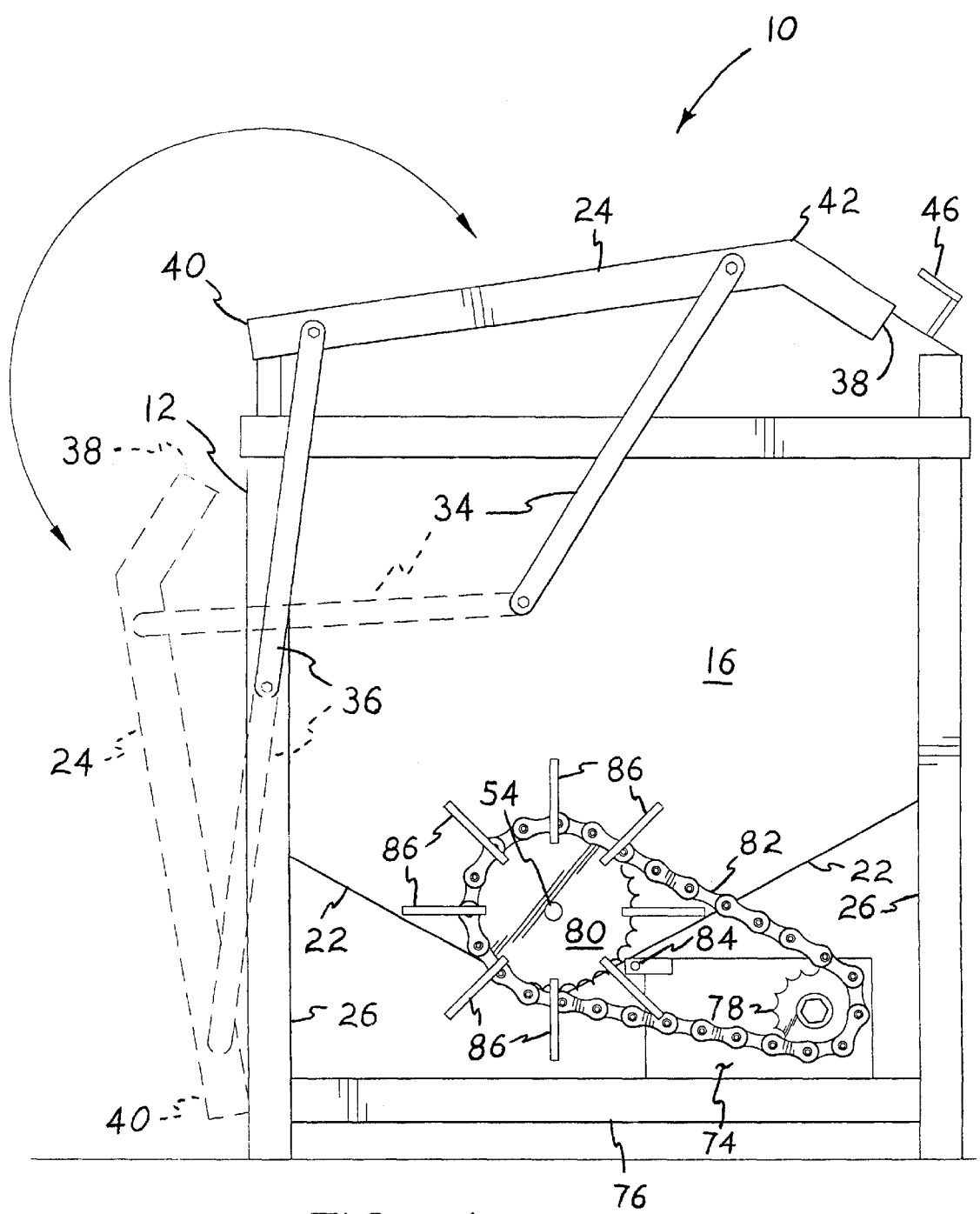
FIG. 4 is a second or drive end elevation view of the present feed dispenser, showing the auger drive and counter mechanism and the operation of the cover or lid of the device.

FIG. 2 illustrates the general procedure for filling the hopper box 12 of the present feed dispenser 10. The truck T is positioned so the hopper box 12 is located beneath a feed dispenser chute C (or the chute C positioned over the hopper 12), and the top or lid 24 is opened to access the interior of the hopper box 12 to receive a load of feed F from the chute C. The top or lid 24 is secured to the hopper box 12 by a pair of hinge arms, respectively 34 and 36, extending from each end 14 and 16 of the hopper 12. The first edge 38 of the top 24 (corresponding to the first sidewall 18 of the hopper 12) is lifted upwardly and moved toward the opposite second sidewall 20 of the hopper 12, while the second hinge arms 36 guide the second edge 40 rearwardly and downwardly. The positions of the top 24 and hinge arms 34 and 36 are illustrated in FIG. 4 of the drawings, with the closed position being shown in solid lines and the open position being shown in broken lines.

As the dispenser 10 is adapted to remain outdoors, or at least to provide weatherproof storage for feed F stored therein, the lid or top 24 includes a lateral gable or peak 42 formed thereon for shedding water, snow, etc. The first edge 38 of the top 24 extends downwardly to overlap a flange 44 (shown more clearly in FIG. 3) extending upwardly from the first side wall 18 of the hopper box 12, thus preventing any runoff from entering the hopper box 12 from beneath the first edge 38 of the top 24. A spoiler or wind break 46 extends across the box 12 just in front of the first edge 38 of the top 12 when it is closed, to prevent wind from lifting the top 12 when the truck T is traveling at any appreciable speed.

Figure 3:
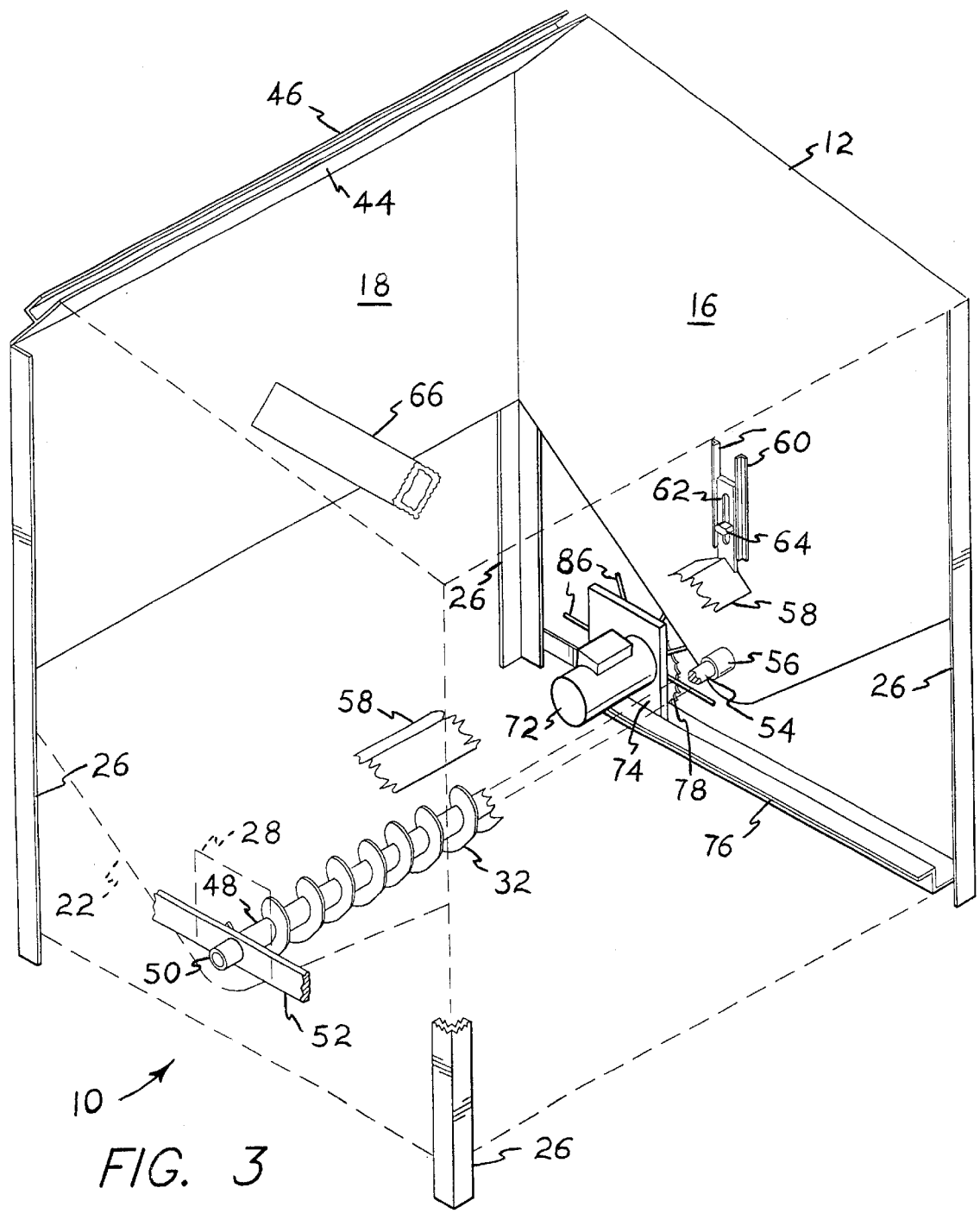
FIG. 3 is a broken away perspective view of the present livestock feed dispenser, showing various internal components.

FIG. 3 illustrates the basic internal components of the present portable feed dispenser 10. As noted further above, a powered auger 32 is positioned in the bottom of the V-shaped bottom panel 22 of the hopper box 12, between the first and second ends 14 and 16 of the hopper. The auger 32 has a first or dispensing end 48 corresponding to the first or dispensing end 14 of the hopper 12, and axially aligned with and adjacent to the dispensing opening 28 (shown in broken lines in FIG. 3). The dispensing end 48 of the auger 32 is supported by a bearing 50 and bearing mount 52, in the conventional manner. The opposite second or drive end 54 of the auger 32 is also supported by a bearing 56 installed in the second end wall 16 of the hopper box 12, with the drive end 54 of the auger 32 extending through the end wall 16 to communicate with a drive system, discussed further below.

The hopper 12 interior includes an auger shroud 58 extending between the first and second end walls 14 and 16. The shroud 58 limits the flow of feed into the auger 32 to prevent jamming of the auger 32 or other problems, and to provide a steady flow of feed to the auger 32. The shroud 58 height is adjustable relative to the auger 32, to adjust for relatively coarse or fine feed (hay, fine grain, etc.). A track 60 comprising a pair of spaced apart angles is provided in each end wall 14 and 16, with a slotted bracket 62 extending upwardly from each end of the auger shroud 58 to ride in its respective track 60. A bolt 64 passes through the slot of the bracket 62 to engage a passage in the respective end wall 14 and 16, to lock the position of the bracket 62 and shroud 58 as desired.

The hopper box 12 interior includes another novel feature, comprising a passage 66 extending through the box 12 from the first side wall 18 to the second side wall 20. The passage 66 comprises a length of square or rectangular steel stock or equivalent material, which is welded or otherwise permanently affixed between the two side walls 18 and 20 to be normal to the two side walls 18 and 20 and parallel to the two end walls 14 and 16. The side walls 18 and 20 each include a corresponding contiguous opening therethrough, respectively 68 (FIG. 6) and 70 (FIG. 1).

The openings 68 and 70 provide a viewport extending through the center of the hopper box 12, so that when the dispenser 10 is positioned upon the bed of a flatbed truck T as illustrated in FIGS. 1 and 2, the operator within the cab or passenger compartment P of the vehicle has at least a limited rearward view through the viewport passage 66. This is sufficient for the operator to align the truck T when backing, as to attach a trailer or the like, or to see a closely following vehicle on the road, etc. The passage 66 also serves as a lifting passage, allowing a conventional bale spear (not shown) to be inserted therein for lifting the feed dispenser 10 onto and from the bed B of the truck T as desired. The diagonal orientation of the square or rectangular passage 66 enables a similarly configured bale spear to be inserted therein, to preclude any axial rotation of the present feed dispenser 10 about the spear during the lifting and transport of the dispenser 10. Passages having other shapes or configurations may be provided as desired.

FIG. 3 also illustrates the auger drive motor 72 (e. g., conventional electric, hydraulic, etc.), with FIG. 4 showing an exemplary drive mechanism between the motor 72 and the drive end 54 of the auger 32. The motor 72 is secured to the frame of the dispenser 10, as by a plate 74 which in turn extends from a lower crossmember 76 installed between the two legs 26 at the second or drive end 16 of the device. The motor 72 drives a first or motor sprocket 78 which in turn drives a second sprocket 80 attached to the auger drive end 54 by means of a roller chain 82.

Figure 5:
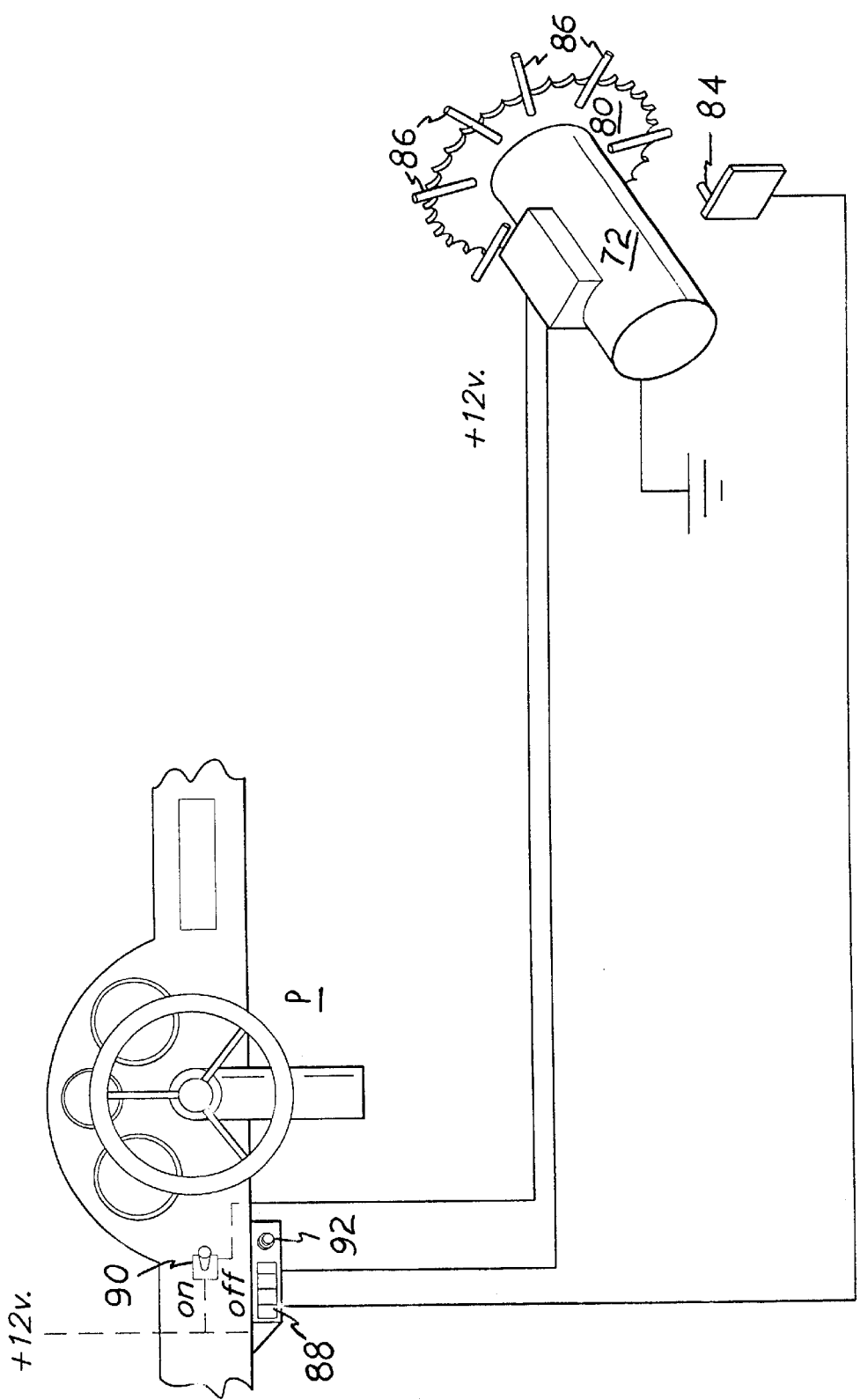
FIG. 5 is a pictorial schematic view of the basic electrical system and control installation for the present invention.

The present feed dispenser 10 includes means for measuring or determining the amount of feed which is dispensed from the device, using a counter system installed with the auger drive sprocket 80. A magnetic proximity switch 84 or other suitable detector extends from the motor mounting plate 74, and is essentially in the plane and just outside the outer edge of the auger drive sprocket 80. A series of ferrous metal rods or the like 86 extend radially from one face of the auger drive sprocket 80, and pass close to the proximity switch or detector 84 for triggering the detector 84 as the sprocket 80 rotates. The signals from the proximity switch or detector 84 pass to a conventional digital electronic display 88, which may be installed adjacent the auger drive mechanism, at the opposite dispensing end adjacent the dispensing chute or door 30, or more preferably within the cab P of the truck T or vehicle, as indicated in FIG. 5 of the drawings. The operator of the vehicle and dispenser 10 may actuate the operation of the auger 32 remotely by means of an on/off switch 90 in the cab P of the truck T.

In addition to the remote operation of the auger motor 72 and auger 32 of the present invention, the electronic operation means provides the advantage of presetting the desired amount of feed to be dispensed and automatically dispensing that quantity with a single touch of the switch. A preset and reset button 92 may be provided at the display panel 88, operating in the conventional manner. The operator may preselect a desired quantity of feed by turning the control 92 to display the desired quantity on the panel 88, and actuate the switch 90 to commence operation. Upon reaching the desired quantity (actually, a predetermined count of the trigger rods 86 passing the detector 84, which corresponds to a predetermined number of revolutions of the auger 32 and thus an amount of feed dispensed by the auger 32), the device automatically interrupts power to the motor 72, to stop the auger 32.

The entire feed dispensing operation may thus be controlled from the passenger compartment P of the truck T, if so desired. The dispenser chute 30 may also be controlled remotely, by a simple rope or cord 94 (shown in FIGS. 1, 2, and 6) which extends from the door 30 to the passenger cab P of the vehicle or truck T. The line 94 may be passed through the door weatherstripping of the vehicle, through a window or other passage, etc. as desired. Alternatively, a conventional solenoid or the like (not shown) may be installed with the dispenser 10 to actuate and close the door 30 as desired, with actuation by means of a separate electrical line, or by the same line used to control the motor 72 to open and close the chute 30 when the motor is actuated or deactivated.

Figure 6:
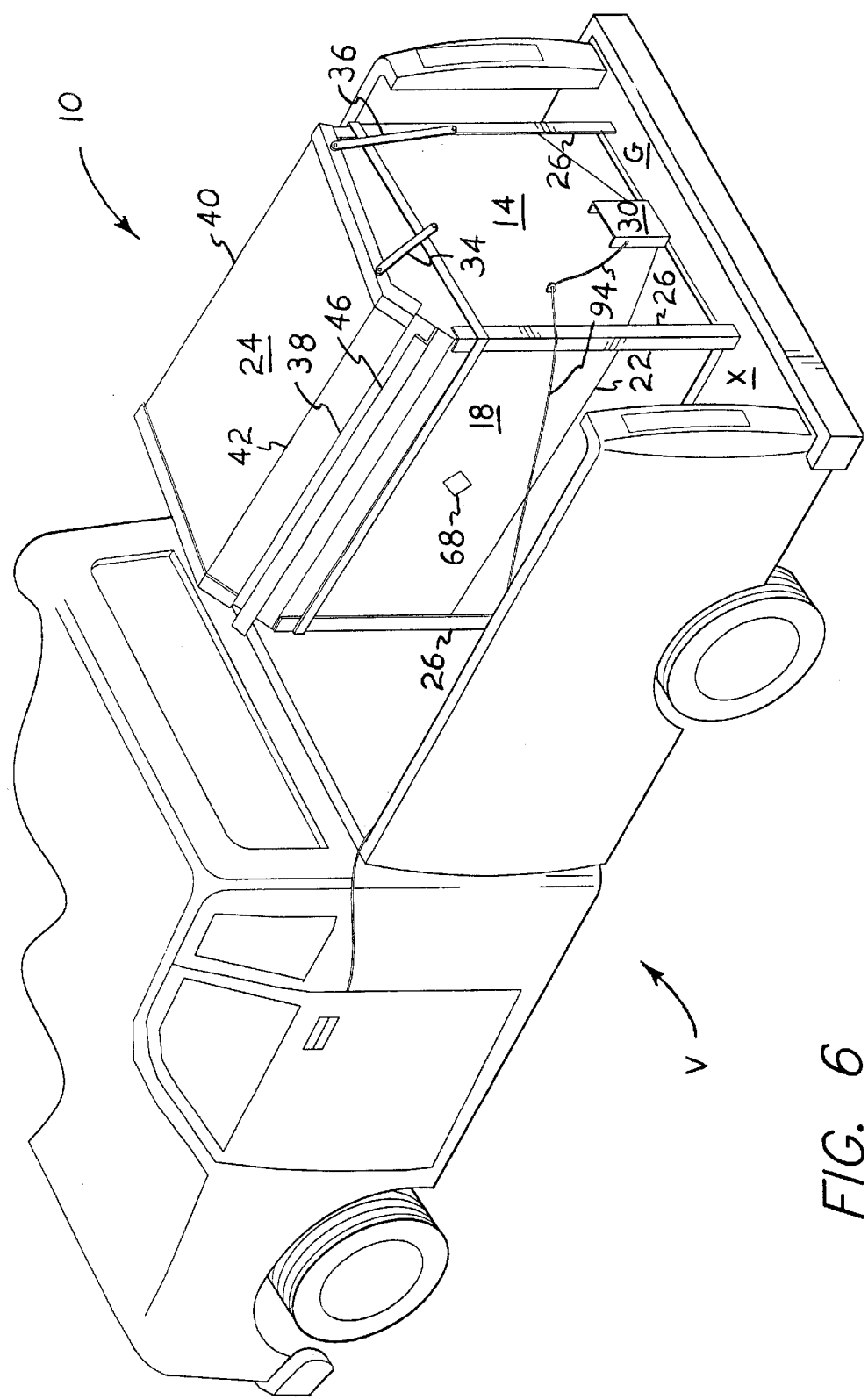
FIG. 6 is a perspective view of an alternate mounting for the present feed dispenser, in which the device is mounted in the bed of a pickup truck with the dispensing chute facing rearwardly.

FIG. 6 illustrates an alternative installation embodiment for the present feed dispenser 10, in which the dispenser is installed in the box X of a conventional pickup truck vehicle V. While the present dispenser 10 is preferably installed with a flatbed truck T, as shown in FIGS. 1 and 2, for convenience in positioning the dispensing chute 30 along the same side of the truck T as the driver or vehicle operator, it will be seen that the present dispenser 10 may be installed with other vehicles as well. A conventional pickup truck vehicle V is suitable, with the installation differing from that shown in FIGS. 1 and 2 only in that the dispenser 10 is turned ninety degrees so the dispensing outlet and chute 30 are positioned at the tailgate end G of the pickup box X. The gate (not shown) may be lowered, or removed entirely as shown in FIG. 6 of the drawings. The same operating systems illustrated in the other drawing Figures, particularly FIG. 5, may be used with the pickup truck vehicle V and dispenser 10 combination shown in FIG. 6. Alternatively, the legs or supports 26 may be made longer so the dispensing outlet 28 and chute 30 are raised above the edge of the pickup box sidewalls, and the dispenser 10 positioned in the same orientation as that shown in FIGS. 1 and 2 with the flatbed truck T, depending upon the width of the pickup truck box X and the feed dispenser 10.

Figure 7:
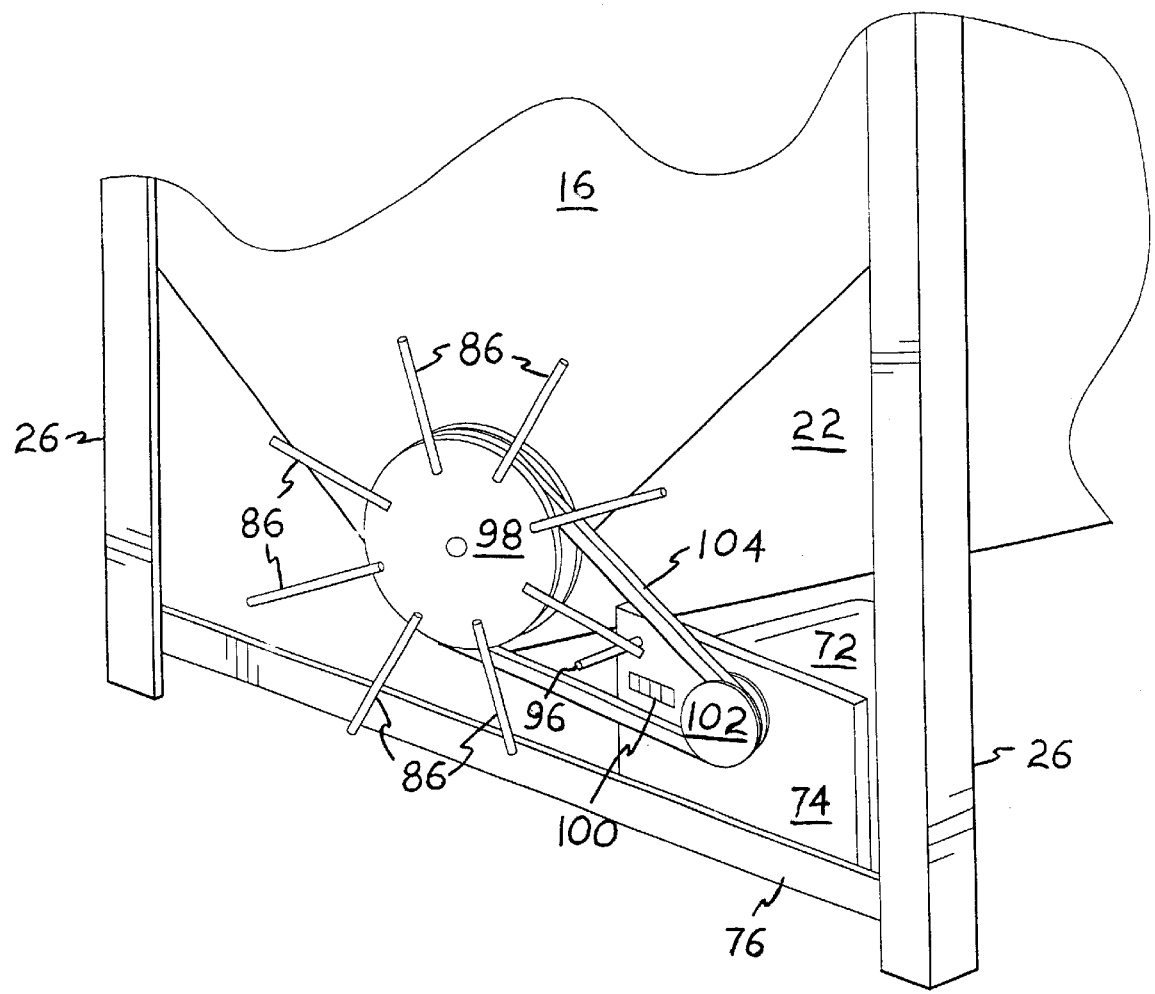
FIG. 7 is a broken away perspective view of an alternate embodiment of the drive and counter means, illustrating a belt and pulley drive system and mechanical counter.

To this point, the means for indicating the amount of feed dispensed has been electrical, as illustrated particularly in FIGS. 4 and 5 of the drawings. However, other means may be used in lieu of such electrical indication means, if desired. FIG. 7 illustrates a mechanical indication system, as well as an alternative auger drive mechanism. In FIG. 7, the sensor or detector comprises an elongate finger 96 which extends through the plane defined by the radially disposed rods 86 extending from an auger drive pulley 98. Each passage of one of the rods 86 trips the finger 96, which actuates a conventional mechanical counter and digital display 100. The counter 100 may be adjusted to indicate the quantity of feed being dispensed at each revolution or number of revolutions of the auger 32, as desired. The counter and digital display 100 are positioned adjacent the auger drive pulley 98, due to the necessity of positioning the counter actuating finger 96 to engage the trip or trigger rods 86 extending from the auger drive pulley 98.

FIG. 7 also discloses an alternative means for driving the auger, by a motor pulley 102 which drives the auger drive pulley 98 with a belt 104. It will be seen that the mechanical counter means of FIG. 7 may be provided in combination with the sprocket and roller chain drive means illustrated in FIGS. 3 through 5, or the electronic counting and display means of FIGS. 4 and 5 may be used with the belt drive system illustrated in FIG. 7, if so desired. Other means of driving the auger (e.g., gearing, etc.) may be provided with the present invention, if so desired. However, the use of a belt drive system such as that illustrated in FIG. 7 of the drawings, may be advantageous in that the belt may slip in the event of an auger jam, thus precluding damage to the auger and/or other components of the system.

In summary, the present portable livestock feed dispenser in its various embodiments, provides a most useful and convenient means of precisely determining the quantity of feed being dispensed to various feeder locations. The entire operation of the present dispenser may be remotely achieved from the comfort of the cab or passenger compartment of the vehicle carrying the dispenser, with no need for the operator to leave the cab of the vehicle at any time until the dispenser requires refilling with feed. While the present livestock feed dispenser is intended for portable use by installing with a flatbed truck or the like, it is easily removed to provide a fixed installation if so desired, or to reinstall upon a different vehicle as desired. The various mechanisms described herein have no practicable limits insofar as size is concerned, so long as the assembly is configured for carriage upon a road or farm vehicle. The present dispenser may be constructed to fit easily in the bed of a compact pickup truck, perhaps having a capacity of only a few hundred pounds of feed, up to much larger sizes capable of carrying perhaps a few tons of feed. The result is a most useful piece of equipment for use by farmers and ranchers who have need to distribute feed to animals spread over a large area.

It is to be understood that the present invention is not limited to the embodiments described above, but encompasses any and all embodiments within the scope of the following claims.

We claim:

1. A portable livestock feed dispenser and feed dispenser vehicle, comprising in combination:

a motor vehicle including a flat cargo bed and an operating cab;

an elongate closed hopper having a first end and a second end opposite said first end, installed upon said cargo bed of said motor vehicle;

a powered auger disposed within said hopper and extending between said first end and said second end of said hopper;

said auger having a first end and a second end opposite said first end, with said first end of said auger corresponding to said first end of said hopper and said second end of said auger corresponding to said second end of said hopper;

a dispensing outlet disposed at said first end of said hopper, and generally axially aligned with said auger and adjacent said first end thereof, and positioned at one edge of said cargo bed; and means for remotely controlling the operation of said auger.

2. The livestock feed dispenser and vehicle combination according to claim 1, including means for determining the amount of feed dispensed by said feed dispenser.

3. The livestock feed dispenser and vehicle combination according to claim 2, wherein said means for-determining the amount of feed dispensed comprises detector means disposed adjacent said second end of said auger, with said second end of said auger including at least one trigger means for actuating said detector means as said auger rotates for dispensing feed.

4. The livestock feed dispenser and vehicle combination according to claim 2, wherein said means for determining the amount of feed dispensed is electrical.

5. The livestock feed dispenser and vehicle combination according to claim 2, wherein said means for determining the amount of feed dispensed is mechanical.

6. The livestock feed dispenser and vehicle combination according to claim 2, including means for remotely reading said means for determining the amount of feed dispensed.

7. The livestock feed dispenser and vehicle combination according to claim 1, including a vertically adjustable auger shroud disposed above said auger, for adjusting feed flow from said hopper to said auger.

8. The livestock feed dispenser and vehicle combination according to claim 1, including an openable lid disposed atop said hopper and hingedly secured thereto.

9. The livestock feed dispenser and vehicle combination according to claim 1, including an auger drive motor and means for powering said auger from said auger drive motor selected from the group consisting of roller chain and sprocket means, and belt and pulley means.

10. The livestock feed dispenser and vehicle combination according to claim 1, including a viewport and lifting passage disposed through said hopper and generally parallel to said first end of said hopper and said second end of said hopper.

11. A portable livestock feed dispenser, comprising:

an elongate closed hopper having a first end and a second end opposite said first end, for installing upon the cargo bed of a motor vehicle having a cargo bed therewith;

a powered auger disposed within said hopper and extending between said first end and said second end of said hopper;

said auger having a first end and a second end opposite said first end, with said first end of said auger corresponding to said first end of said hopper and said second end of said auger corresponding to said second end of said hopper;

a dispensing outlet disposed at said first end of said hopper, and generally axially aligned with said auger and adjacent said first end thereof;

means for remotely controlling the operation of said auger; and means for determining the amount of feed dispensed including detector means disposed adjacent said second end of said auger, with said second end of said auger including at least one trigger means for actuating said detector means as said auger rotates for dispensing feed.

12. The livestock feed dispenser according to claim 11, including means for remotely reading said means for determining the amount of feed dispensed.

13. The livestock feed dispenser according to claim 11, including an auger drive motor and means for powering said auger from said auger drive motor selected frog the group consisting of roller chain and sprocket means, and belt and pulley means.

14. The livestock feed dispenser according to claim 11, including a vertically adjustable auger shroud disposed above said auger, for adjusting feed flow from said hopper to said auger.

15. The livestock feed dispenser according to claim 11, including an openable lid disposed atop said hopper and hingedly secured thereto.

16. The livestock feed dispenser according to claim 11, including a viewport and lifting passage disposed through said hopper and generally parallel to said first end of said hopper and said second end of said hopper.

17. A portable livestock feed dispenser, comprising:

an elongate closed hopper having a first end and a second end opposite said first end, for installing upon the cargo bed of a motor vehicle having a cargo bed therewith;

a powered auger disposed within said hopper and extending between said first end and said second end of said hopper;

said auger having a first end and a second end opposite said first end, with said first end of said auger corresponding to said first end of said hopper and said second end of said auger corresponding to said second end of said hopper;

a dispensing outlet disposed at said first end of said hopper, and generally axially aligned with said auger and adjacent said first end thereof;

means for remotely controlling the operation of said auger; and a vertically adjustable auger shroud disposed above said auger, for adjusting feed flow from said hopper to said auger.

18. A portable livestock feed dispenser, comprising:

an elongate closed hopper having a first end and a second end opposite said first end, for installing upon the cargo bed of a motor vehicle having a cargo bed therewith;

a powered auger disposed within said hopper and extending between said first end and said second end of said hopper;

said auger having a first end and a second end opposite said first end, with said first end of said auger corresponding to said first end of said hopper and said second end of said auger corresponding to said second end of said hopper;

a dispensing outlet disposed at said first end of said hopper, and generally axially aligned with said auger and adjacent said first end thereof;

means for remotely controlling the operation of said auger; and a viewport and lifting passage disposed through said hopper and generally parallel to said first end of said hopper and said second end of said hopper.

* * * * *